(12) United States Patent
Hillis et al.

(10) Patent No.: US 7,728,821 B2
(45) Date of Patent: Jun. 1, 2010

(54) TOUCH DETECTING INTERACTIVE DISPLAY

(75) Inventors: W. Daniel Hillis, Encino, CA (US);
Bran Ferren, Beverly Hills, CA (US);
Ryan McKinley, Orinda, CA (US)

(73) Assignee: Touchtable, Inc., Pasadena, CA (US)

( * ) Notice: Subject to any disclaimer, the term of this patent is extended or adjusted under 35 U.S.C. 154(b) by 1550 days.

(21) Appl. No.: 10/913,105

(22) Filed: Aug. 6, 2004

(65) Prior Publication Data

US 2006/0274046 A1   Dec. 7, 2006

(51) Int. Cl.
*G06F 3/041* (2006.01)
(52) U.S. Cl. .................. 345/173; 345/175; 345/179; 178/18.01
(58) Field of Classification Search ......... 345/156–158, 345/173–179; 178/18.01–18.04
See application file for complete search history.

(56) References Cited

U.S. PATENT DOCUMENTS

| | | | |
|---|---|---|---|
| 3,478,220 A | 11/1969 | Milroy | |
| 3,673,327 A | 6/1972 | Johnson | |
| 3,764,813 A | 10/1973 | Clement | |
| 3,775,560 A | 11/1973 | Ebeling | |
| 3,860,754 A | 1/1975 | Johnson | |
| 4,144,449 A | 3/1979 | Funk et al. | |
| 4,245,634 A | 1/1981 | Albisser | |
| 4,247,767 A | 1/1981 | O'Brien et al. | |
| 4,463,380 A * | 7/1984 | Hooks, Jr. | .................. 348/580 |
| 4,507,557 A | 3/1985 | Tsikos | |
| 4,517,559 A | 5/1985 | Deitch | |

(Continued)

FOREIGN PATENT DOCUMENTS

EP   0 881 592 B2   10/2002

(Continued)

OTHER PUBLICATIONS

M. Wu, C. Shen, K. Ryall, C. Forlines, and R. Balakrishnan. (2006); Gesture Registration, Relaxation, and Reuse for Multi-Point Direct-Touch Surfaces; in Proceedings of IEEE Tabletop 2006 Conference on Horizontal Interactive Human-Computer Systems, Adelaide, South Australia; 8 pages. M.Wu and R. Balakrishnan; (2003).

(Continued)

*Primary Examiner*—Richard Hjerpe
*Assistant Examiner*—Kimnhung Nguyen
(74) *Attorney, Agent, or Firm*—Michael A. Glenn; Glenn Patent Group

(57) ABSTRACT

The invention provides an interactive display that is controlled by user gestures identified on a touch detecting display surface. In the preferred embodiment of the invention, imagery is projected onto a horizontal projection surface from a projector located above the projection surface. The locations where a user contacts the projection surface are detected using a set of infrared emitters and receivers arrayed around the perimeter of the projection surface. For each contact location, a computer software application stores a history of contact position information and, from the position history, determines a velocity for each contact location. Based upon the position history and the velocity information, gestures are identified. The identified gestures are associated with display commands that are executed to update the displayed imagery accordingly. Thus, the invention enables users to control the display through direct physical interaction with the imagery.

79 Claims, 7 Drawing Sheets

U.S. PATENT DOCUMENTS

| | | | |
|---|---|---|---|
| 4,527,240 A | 7/1985 | Kvitash | |
| 4,722,053 A | 1/1988 | Dubno | |
| 4,742,221 A | 5/1988 | Sasaki | |
| 4,746,770 A | 5/1988 | McAvinney | |
| 4,782,328 A | 11/1988 | Denlinger | |
| 5,105,186 A * | 4/1992 | May | 345/175 |
| 5,239,373 A * | 8/1993 | Tang et al. | 348/14.01 |
| 5,379,238 A | 1/1995 | Stark | |
| 5,436,639 A * | 7/1995 | Arai et al. | 345/156 |
| 5,448,263 A | 9/1995 | Martin | |
| 5,483,261 A | 1/1996 | Yasutake | |
| 5,512,826 A | 4/1996 | Hardy et al. | |
| 5,528,263 A * | 6/1996 | Platzker et al. | 345/156 |
| 5,971,922 A | 10/1999 | Arita | |
| 5,982,352 A | 11/1999 | Pryor | |
| 6,008,798 A | 12/1999 | Mato, Jr. | |
| 6,057,845 A | 5/2000 | Dupouy | |
| 6,141,000 A | 10/2000 | Martin | |
| 6,215,477 B1 | 4/2001 | Morrison | |
| 6,232,957 B1 | 5/2001 | Hinckley | |
| 6,240,306 B1 | 5/2001 | Rohrscheib | |
| 6,280,381 B1 | 8/2001 | Malin | |
| 6,309,884 B1 | 10/2001 | Cooper | |
| 6,333,753 B1 | 12/2001 | Hinckley | |
| 6,335,722 B1 | 1/2002 | Tani et al. | |
| 6,335,724 B1 | 1/2002 | Takekawa | |
| 6,337,681 B1 | 1/2002 | Martin | |
| 6,352,351 B1 | 3/2002 | Ogasahara | |
| 6,379,301 B1 | 4/2002 | Worthington | |
| 6,384,809 B1 * | 5/2002 | Smith | 345/101 |
| 6,414,671 B1 | 7/2002 | Gillespie | |
| 6,415,167 B1 | 7/2002 | Blank | |
| 6,421,042 B1 | 7/2002 | Omura | |
| 6,429,856 B1 | 8/2002 | Omura | |
| 6,487,429 B2 | 11/2002 | Hockersmith | |
| 6,504,532 B1 | 1/2003 | Ogasahara | |
| 6,512,936 B1 | 1/2003 | Monfre | |
| 6,518,959 B1 | 2/2003 | Ito | |
| 6,528,809 B1 | 3/2003 | Thomas | |
| 6,531,999 B1 | 3/2003 | Trajkovic | |
| 6,532,006 B1 | 3/2003 | Takekawa | |
| 6,563,491 B1 | 5/2003 | Omura | |
| 6,594,023 B1 | 7/2003 | Omura | |
| 6,608,619 B2 | 8/2003 | Omura et al. | |
| 6,636,635 B2 | 10/2003 | Matsugu | |
| 6,651,061 B2 | 11/2003 | Uchida | |
| 6,654,007 B2 | 11/2003 | Ito | |
| 6,654,620 B2 | 11/2003 | Wu | |
| 6,675,030 B2 | 1/2004 | Ciurczak | |
| 6,723,929 B2 | 4/2004 | Kent | |
| 6,747,636 B2 | 6/2004 | Martin | |
| 6,764,185 B1 | 7/2004 | Beardsley | |
| 6,765,558 B1 | 7/2004 | Dotson | |
| 6,788,297 B2 * | 9/2004 | Itoh et al. | 345/179 |
| 6,791,700 B2 | 9/2004 | Omura | |
| 6,803,906 B1 | 10/2004 | Morrison | |
| 6,810,351 B2 | 10/2004 | Katsurahira | |
| 6,825,890 B2 | 11/2004 | Matsufusa | |
| 6,828,959 B2 | 12/2004 | Takekawa | |
| 6,885,883 B2 | 4/2005 | Parris | |
| 6,888,536 B2 | 5/2005 | Westerman | |
| 6,922,642 B2 * | 7/2005 | Sullivan | 702/56 |
| 6,998,247 B2 | 2/2006 | Monfre | |
| 6,999,061 B2 | 2/2006 | Hara et al. | |
| 7,339,580 B2 | 3/2008 | Westerman et al. | |
| 7,474,296 B2 | 1/2009 | Obermeyer et al. | |
| 2001/0016682 A1 | 8/2001 | Berner | |
| 2001/0019325 A1 | 9/2001 | Takekawa | |
| 2001/0022579 A1 | 9/2001 | Hirabayashi | |
| 2001/0026268 A1 | 10/2001 | Ito | |
| 2002/0019022 A1 | 2/2002 | Dunn | |
| 2002/0036617 A1 | 3/2002 | Pryor | |
| 2002/0132279 A1 | 9/2002 | Hockersmith | |
| 2002/0185981 A1 | 12/2002 | Dietz | |
| 2003/0001825 A1 | 1/2003 | Omura et al. | |
| 2003/0063775 A1 | 4/2003 | Rafii et al. | |
| 2003/0137494 A1 | 7/2003 | Tulbert | |
| 2003/0231167 A1 | 12/2003 | Leung | |
| 2004/0033618 A1 | 2/2004 | Haass | |
| 2004/0046744 A1 | 3/2004 | Rafii et al. | |
| 2004/0106163 A1 | 6/2004 | Workman | |
| 2005/0038674 A1 | 2/2005 | Braig | |
| 2005/0052427 A1 | 3/2005 | Wu et al. | |
| 2005/0106651 A1 | 5/2005 | Chaiken | |
| 2006/0022955 A1 * | 2/2006 | Kennedy | 345/173 |
| 2006/0026521 A1 | 2/2006 | Hotelling et al. | |
| 2006/0026536 A1 * | 2/2006 | Hotelling et al. | 715/863 |
| 2006/0063218 A1 | 3/2006 | Bartkowiak | |
| 2007/0252821 A1 | 11/2007 | Hollemans et al. | |
| 2007/0268273 A1 | 11/2007 | Westerman et al. | |
| 2008/0211785 A1 | 9/2008 | Hotelling et al. | |

FOREIGN PATENT DOCUMENTS

| | | |
|---|---|---|
| EP | 0 881 591 B1 | 9/2003 |
| JP | 2001-175807 | 6/2001 |
| WO | WO02/16905 | 2/2002 |

OTHER PUBLICATIONS

Multi-Finger and Whole Hand Gestural Interaction Techniques for Multi-User Tabletop Displays; ACM CHI Letters, 5(2); 193-202.

ACM UIST 2003 Symposium on User Interface Software & Technology, Vancouver, Canada; Nov. 2003; pp. 193-202.

Bennon, Nancy, "Alternate Site Glucose Testing: a Crossover Design", Diabetes Technology & Therapeutics, vol. 4, No. 1, pp. 25-33, 2002.

Blank, T.B. et al., "Clinical Results from a Noninvasive Blood Glucose Monitor", Optical Diagnostics and Sensing of Biological Fluids and Glucose and Cholesterol Monitoring II., Proceedings of SPIE vol. 4624, pp. 1-10, 2002.

Diabetes Statistics, Bethesda, MD, National Institute of Health, Pub. No. 98-3926, Nov. 1997.

Fischer, Jerome S. et al., "Comparisons of Capillary Blood Glucose Concentrations from the Fingertips and the Volar Aspects of the Left and Right Forearm", Instrumentations Metrics, Inc., American Diabetes Association, 62 Annual Meeting, Jun 14, 2002.

Hazen, Kevin H., "Glucose Determination in Biological Matrices Using Near-Infrared Spectroscopy", Doctoral Dissertation, University of Iowa, 1995.

Johnson, Paul C., Peripheral Circulation, New York, pp. 198, 1978.

Jungheim K. et al., "Glucose Monitoring at the Arm", Diabetes Care, vol. 25, No. 6, Jun 2002.

Jungheim K. et al., "Risky Delay of Hypoglycemia Detection by Glucose Monitoring at the Arm", Diabetes Care, vol. 24, No. 7, pp. 1303-1304, Jul. 2001.

Jungheim, Karsten et al., "Response to Jungheim and Koschinsky" Diabetes Care, vol. 24, No. 7, pp. 1304-1306, Jul. 2001.

Khalil, Omar S., "Spectroscopic and Clinical Aspects of Noninvasive Glucose Measurements", Clinical Chemistry 45:2, pp. 165-177, 1999.

Klonoff, David C., "Noninvasive Blood Glucose Monitoring", Diabetes Care, vol. 20, No. 3, pp. 433-437, Mar. 1997.

Lee, Debra et al., "A Study of Forearm Versus Finger Stick Glucose Monitoring", Diabetes Technology & Therapeutics, vol. 4, No. 1 pp. 13-23, Jun. 2001.

Malin, Stephen F., et al., "Noninvasive Prediction of Glucose by Near Infrared Spectroscopy", Clinical Chemistry, vol. 45, No. 9, pp. 1651-1658, 1999.

McGarraugh, Geoff et al., "Glucose Measurements Using Blood Extracted from the Forearm and Finger", TheraSense, Inc., ART010022 Rev. C, 2001.

McGarraugh, Geoff et al., "Physiological Influences on Off-Finger Glucose Testing", Diabetes Technology & Therapeutics, vol. 3, No. 3, pp. 367-376, 2001.

Monfre, Stephen L. et al., "Physiologic Differences between Volar and Dorsal Capillary Forearm Glucose Concentrations and Finger Stock Concentrations", Instrumentations Metrics, Inc., American Diabetes Association, 62 Annual Meeting, Jun. 14, 2002.

Ohkudo, Yasuo et al., "Intensive Insulin Therapy Prevents the Progression of Diabetic Microvascular Complications in Japanese Patients with Non-Insulin-Dependent Diabetes Mellitus: A Randomized Prospective 6-year Study", Diabetes Research and Clinical Practice, vol. 28, pp. 103-117, 1995.

Peled, Nina'et al., "Comparison of Glucose Levels in Capillary Blood Samples from a Variety of Body Sites", Diabetes Technology & Therapeutics, vol. 4, No. 1, pp. 35-44, 2002.

Ryan, T.J., "A Study of the Epidermal Capillary Unit in Psoriasis", Dermatologia 138: 459-472, 1969.

Sparks, Harvey V., "Skin and Muscle", Peripheral Circulation, New York, pp. 193-230, 1978.

Summary Minutes of the Clinical Chemistry and Clinical Toxicology Devices Meeting, Oct. 29, 2001.

Szuts, Ete Z. et al., "Blood Glucose Concentrations of Arm and Finger During Dynamic Glucose Conditions", Diabetes Technology & Therapeutics, vol. 4, No. 1, pp. 3-11, 2002.

Tamada Janet A et al., "Noninvasive Glucose Monitoring Comprehensive Clinical Results", JAMA vol. 282, No. 19, pp. 1839-1844, Nov. 17, 1999.

The Diabetes Control and Complications Trial Research Group, "The Effect of Intensive Treatment of Diabetes on the Development and Progression of Long-Term Complication in Insulin-Dependent Diabetes Mellitus", New Eng. J. Med., vol. 329, No. 14, pp. 997-986, Sep. 30,1993.

Tranjanowski, Zlatko, et al., "Open-Flow Microperfusion of Subcutaneous Adipose Tissue for On-Line Continuous Ex Vivo Measurement of Glucose Concentration", Diabetes Care, vol. 20, No. 7, pp. 1114-1120, Jul. 1997.

Tranjanowski, Zlatko, et al., "Portable Device for Continuous Fractionated Blood Sampling and Continuous Ex Vivo Blood Glucose Monitoring", Biosensors & Bioelectronics, vol. 11, No. 5, pp. 479-487, 1996.

U.K. Prospective Diabetes Study (UKPDS) Group. "Intensive Blood-Glucose Control with Sulphonylureas or Insulin Compared with Conventional Treatment and Risk of Complications in Patients with Type 2 Ddiabetes (UKPDS 33)", The Lancet, vol. 352, Sep. 12, 1998.

Welch, Matt et al., "Alternative Site: Fingertip vs. Forearm", Instrumentation Metrics, Inc., Internal Report, Dec. 12, 2001.

Zheng, Peng, et al., "Noninvasive Glucose Determination by Oscillating Thermal Gradient Spectrometry", Diabetes Technology & Therapeutics, vol. 2., No. 1, pp. 17- 25, 2000.

DiamondTouch Applications-Essenther, Frolines, Ryall, Shipman Diamond Touch for Multi-User Multi-Touch Applications-ACM Conference on Computer Supported Cooperative Work Nov. 2002 (CSCW 2002, TR2002-048).

NCSA (National Center for Supercomputing Applications) GM Slab Console—Johnson and Curtis Univ. Of Illinois.

NCSA (National Center for Supercomputing Applications) GM Slab Function—Johnson and Curtis Univ. Of Illinois.

Smart Board™ for Flat Panel Displays (Interactive Overlay)—Smart Technologies Inc.

SmartSkin: An Infrastructure for Freehand Manipulation on Interactive Surfaces—J. Rekimoto, Interaction Laboratory Sony Computer Science Laboratories, Inc. 2002.

The Laser Wall—Paradiso and Strickon—Media Lab 1997.

TechoOnLine—Touchscreens Provide a Robust and Intuitive User Interface—ELO TouchSystems by Charles H. Small.

"Functionality: Console Display", Mississippi RiverWeb Museum Consortium, University of Illinois, Champagne-Urbana, National Center for Supercomputing Applications, 2003.

"Diamond Touch Applications" Mitsubishi Electric Research Laboratories, Aug. 2004.

* cited by examiner

TOUCH DETECTING INTERACTIVE DISPLAY

BACKGROUND OF THE INVENTION

1. Technical Field

The invention relates to interactive displays. More particularly, the invention relates to multi-user displays suitable for displaying geographical imagery.

2. Description of the Prior Art

There are many situations in which one or more individuals interactively explore image based data. For example, a team of paleontologists may wish to discuss an excavation plan for a remote site dig. To do so, they wish to explore in detail the geographic characteristics of the site as represented on digitized maps. In most laboratories, this requires the team either to huddle around a single workstation and view maps and images on a small display, or sit at separate workstations and converse by phone.

The activity of exploring imagery is much more easily and effectively accomplished with the users surrounding a single large display. While such displays do exist, the interface to the display is typically still operated by a single user. For example, the National Center for Supercomputing Applications (NCSA) and the Geographic Modeling Systems Laboratory have developed an interactive display for museum exhibits in which imagery is displayed on a large horizontal projection surface (http://archive.ncsa.uiuc.edu/Cyberia/RWConsort_UIUC/index.html). A nearby touch screen control console allows visitors to move through and investigate 3-D graphical representations" of the exhibited geographic region. However, as the adjacent touch screen console must still be operated by a single user, the ability of the team as a whole to interact meaningfully with the display is limited.

Moreover, the interfaces to most displays are not particularly intuitive. While the NCSA system does provide a convenient touch screen interface, it is disjoint from the display itself, distancing the controlling user from the display and lessening any sense of immersion within the imagery. Other displays do not offer even this level of convenience, requiring users to manipulate the imagery through the use of keyboards and pointing devices such as mice.

It would be advantageous to provide a collaborative display with which several users can meaningfully discuss and interact with imagery as a group. It would also be advantageous if such a display allowed the users to control the imagery and underlying information through direct interaction with the display itself, using a set of natural gestures. It would be further advantageous to provide a display that is useful for individuals exploring Geographic Information Systems (GIS) data, such as scientists and military planners.

SUMMARY

The invention provides an interactive display that is controlled by user gestures identified on a touch detecting display surface. In the preferred embodiment of the invention, imagery is projected onto a horizontal projection surface from a projector located above the projection surface. Locations where a user contacts the projection surface are detected using a set of infrared emitters and receivers arrayed around the perimeter of the projection surface. For each contact location, a computer software application stores a history of contact position information and, from the position history, determines a velocity for each contact location. Based upon the position history and the velocity information, gestures are identified. The identified gestures are associated with display commands that are executed to update the displayed imagery accordingly. Thus, the invention enables users to control the display through direct physical interaction with the imagery.

The contact locations may be detected by any of several approaches, including infrared emitters and receivers, a capacitive or resistive touch pad, ultrasound, and visual analysis of a material layer below the display surface that exhibits a visible change in response to applied pressure. Optionally, the position history and velocity information are supplemented with measurements of the intensity with which a user contacts the display surface. Optionally, the position history and velocity information are supplemented with measurements of the intensity with which a user contacts the display surface.

In the preferred embodiment of the invention, gestures are identified and associated with commands by pairing each contact location with a pixel within the imagery and updating the imagery, such that each of the pixels remains coincident with the corresponding contact location. Alternatively, gestures are identified by classifying the position history and velocity information as one of several distinct, allowable gestures.

Commands that may be associated with the identified gestures include, for example, panning, zooming and rotation. Objects represented within the imagery may be selected, and menus and submenus may be navigated. If the displayed imagery contains imagery layers, as in the case of geographical information systems imagery, the visibility and transparency of the layers may be adjusted. The displayed imagery preferably includes a control interface, such as a menu, positioned near and oriented towards a point on the edge of the display surface. At the request of a user, the control interface may be repositioned near and oriented towards another point on the edge of the display surface. Finally, the display surface is preferably surrounded by a railing that provides a visual cue that discourages users from leaning onto the display surface.

DETAILED DESCRIPTION OF A PREFERRED EMBODIMENT

The invention provides an interactive display that is controlled by user gestures identified on a touch detecting display surface.

Figure 1:
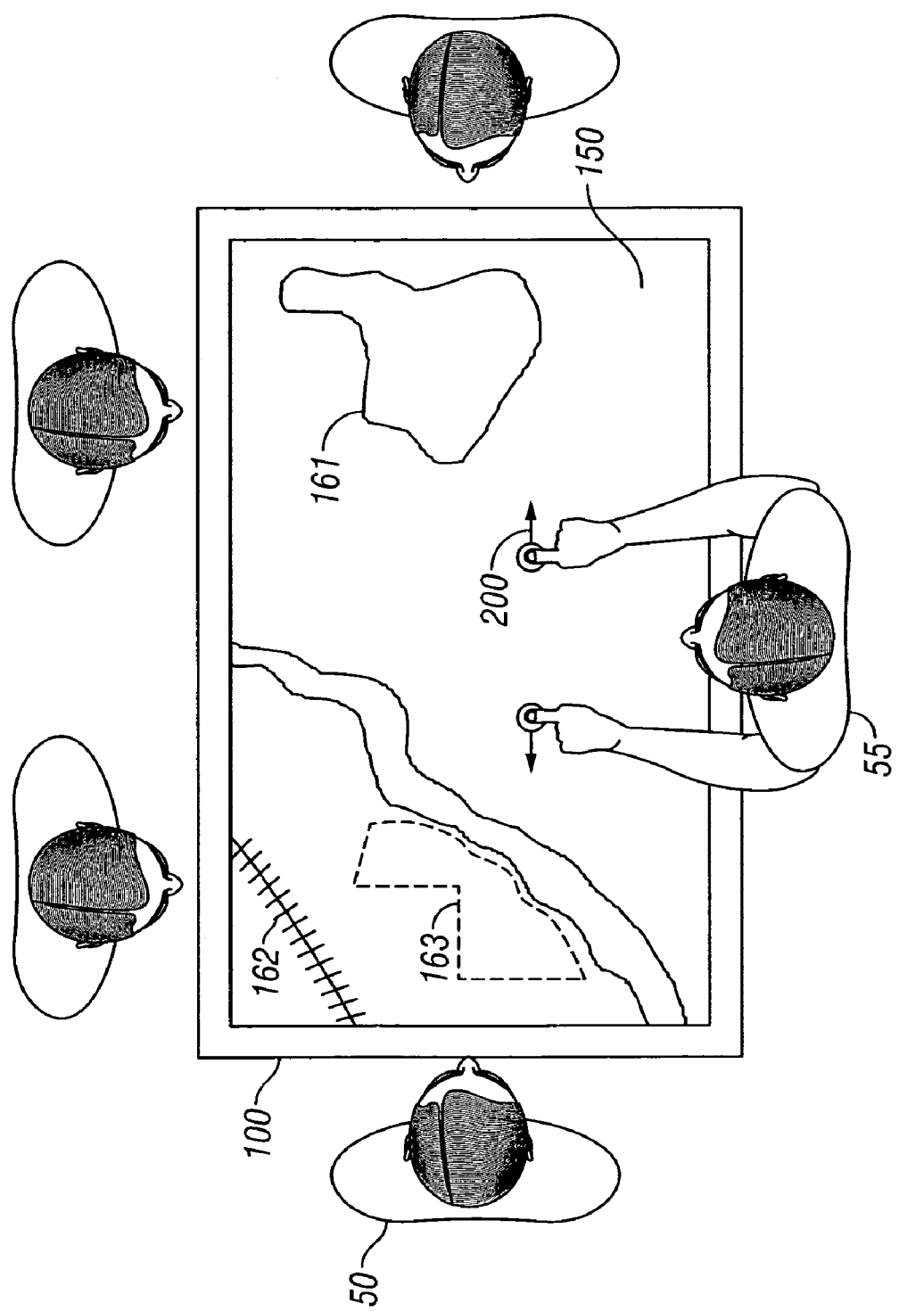
FIG. 1 shows several users operating an interactive, touch detecting display according to a preferred embodiment of the invention.

FIG. 1 shows several users operating an interactive, touch detecting display according to a preferred embodiment of the invention. The users 50 surround the display 100, such that each user can view the display surface 150, which shows imagery of interest to the users. For example, the display may present Geographic Information System (GIS) imagery characterized by geographic 161, economic 162, political 163, and other features, organized into one or more imagery layers. Because the users can comfortably surround and view the display, group discussion and interaction with the display is readily facilitated.

The display surface is capable of detecting when and where a user touches the display surface. Based upon this information, user gestures are identified, and a command associated with the user gesture is determined. The command is executed, altering the displayed imagery in the manner requested by the user via the gesture. For example, in FIG. 1, a user 55 gestures by placing his fingertips on the display surface and moving them in an outwardly separating manner. This particular gesture 200 is preferably associated with an inward zoom command. When the zoom command is executed, the display provides a closer, more detailed view of the displayed imagery.

Figure 2:
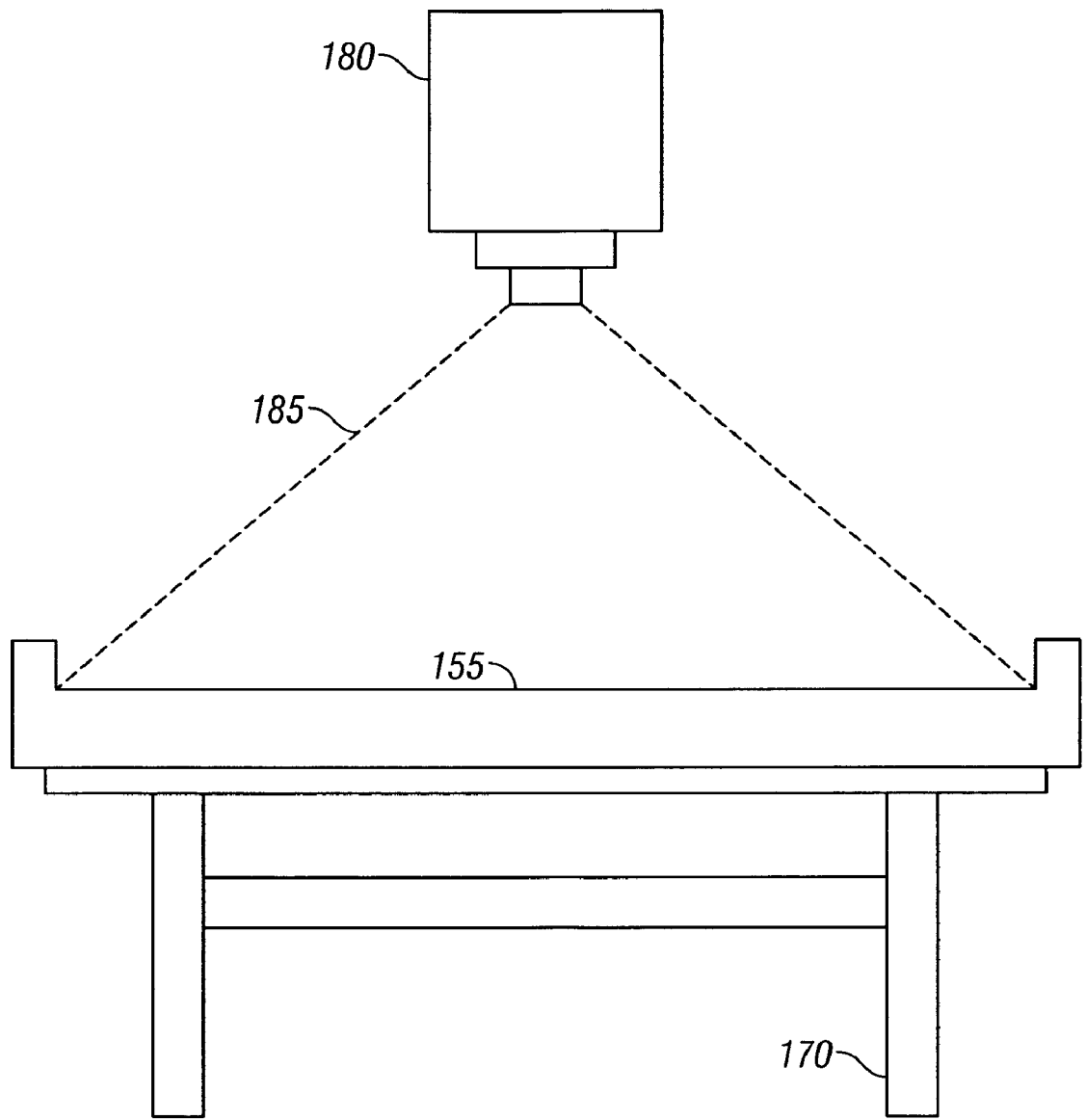
FIG. 2 shows a side view of an interactive, touch detecting, tabletop projection display according to a preferred embodiment of the invention.

FIG. 2 shows a side view of an interactive, touch detecting, tabletop projection display according to a preferred embodiment of the invention. The display surface is a horizontally oriented, planar projection surface 155 supported by a table-like structure 170. The table-like structure preferably supports the projection surface at waist level for adult users, allowing the users to view and touch the entirety of the projection surface comfortably. The displayed imagery is generated by a projector 180 located above and projecting 185 downward onto the projection surface.

While projection from above onto a horizontally oriented display is preferred, other display surface orientations, projector configurations, and display technologies are possible. For example, a horizontally oriented rear-projection surface may be used as the display surface, with the projector mounted below the display surface, projecting in an upward direction. This approach offers the advantage of eliminating the shadows generated in those configurations where a user may position his body between the projector and the projection surface. The display may also be mounted in a vertical orientation and affixed to a wall or other supporting structure. In this case, nonprojection, thin profile display technologies may be most appropriate, such as LCD's, OLED's, or plasma displays, although those skilled in the art will appreciate that any display technology may be used in connection with the invention herein.

Figure 3:
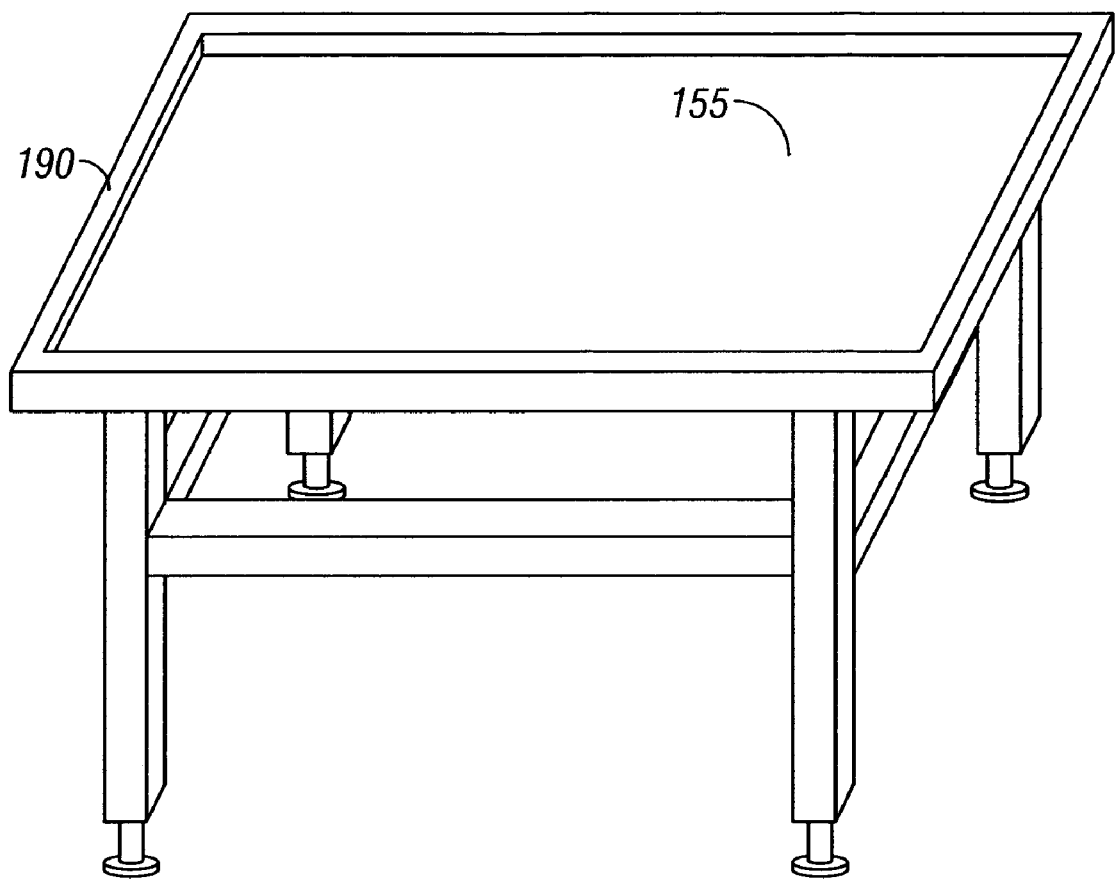
FIG. 3 shows a perspective view of an interactive, touch detecting, tabletop projection display according to the preferred embodiment of the invention.

FIG. 3 shows a perspective view of an interactive, touch detecting, tabletop projection display according to the preferred embodiment of the invention. A consequence of the preferred horizontal orientation of the display surface is a natural inclination of users to rest a hand on the projection surface for support, especially when leaning forward to point to objects near the center of the projection surface. Such contact with the display is potentially erroneously interpreted as a gesture. Accordingly, the projection surface 155 is preferably surrounded by a small railing 190. The railing provides a visual cue that discourages users from leaning onto the display, and also provides structural support should the a user wish to lean forward towards the center of the display.

Detection of when and where a user touches the display surface may be achieved by a number of different approaches. In the preferred embodiment of the invention, a set of infrared emitters and receivers is arrayed around the perimeter of the projection surface, oriented such that each emitter emits light in a plane a short distance above the projection surface. The location where the user is touching the projection surface is determined by considering which emitters are and are not occluded as viewed from each of the receivers. A configuration incorporating a substantially continuous set of emitters around the perimeter and three receivers, each positioned in a corner of the projection surface, is particularly effective in resolving multiple locations of contact.

Alternatively, a resistive touch pad, such as those commonly used in laptop computers, may be placed beneath a flexible display surface. The resistive touch pad comprises two layers of plastic that are separated by a compressible insulator such as air, and a voltage differential is maintained across the separated layers. When the upper layer is touched with sufficient pressure, it is deflected until it contacts the lower layer, changing the resistive characteristics of the upper to lower layer current pathway. By considering these changes in resistive characteristics, the location of the contact can be determined. Capacitive touch pads may also be used, such as the Synaptics TouchPad™ (www.synaptics.com/products/touchpad.cfm).

In yet another embodiment of the invention, a thin layer of material that changes optical properties in response to pressure, such as a liquid crystal film, is placed beneath a flexible display surface. One or more video cameras trained on the underside of the material capture the changes in optical properties that occur when a user touches the projection surface and therefore applies pressure to the thin layer. The location of contact is then determined through analysis of the video camera images. Alternatively, ultrasound may be used to detect contact information. Further, a combination of such schemes, e.g. IR and ultrasound, may be used to detect contact information.

Regardless of the approach used to determine contact locations on the display surface, the location information is analyzed to identify user gestures. In the preferred embodiment of the invention, the infrared emitters and receivers periodically provide location information to a computer software application. For each of M distinct contact locations, the software records over time the discrete sequence of positions $\vec{x}_i(n)$, where $i \in [1,M]$. To determine whether or not two contact locations are distinct from one another, the distance between the points of contact may be considered, with two points separated by a distance greater than a predetermined threshold distance $\epsilon_d$ considered distinct contact locations.

By considering a recent history of the contact positions, a discrete sequence of velocities $\vec{v}_i(n)$, including both a rate and direction of motion, is determined for each distinct contact. Most simply, $$\vec{v}_i(n) = \frac{1}{\Delta T}[\vec{x}_i(n) - \vec{x}_i(n-1)]$$

where $\Delta T$ is the interval at which the infrared emitters and receiver periodically provide location information. Preferably, to provide a smoothing effect and to mitigate the affects of noise in the contact location measurements, a longer history of position information is incorporated. For example, the expression $$\vec{v}_i(n) = \frac{1}{N\Delta T}[\vec{x}_i(n) - \vec{x}_i(n-N)]$$

may be used, where N is the number of time steps that are considered in the recent history. More sophisticated techniques may also be employed, such as a least squares curve fit to the recent history of contact positions.

The position and velocity information determined in this manner is used to identify gestures. The gestures are in turn associated with specific display commands, which are executed to update the display as desired by the user. In the preferred embodiment of the invention, gestures are both identified and associated with display control commands via a single procedure. Up to two distinct contact locations are tracked by the software. That is, M is constrained to be less than two at any one time interval n. If a third contact location is identified, it is ignored until one or both of the existing contact locations is released by the user. The one or two contact locations are associated with individual points within the displayed imagery, i.e. pixels. As the positions of the contact locations move, the display is updated such that the pixels within the image remain coincident with the contact locations. Thus, to the user, the displayed image appears and feels to be an elastic sheet of paper that can be translated, rotated, and stretched as desired.

Figure 4:
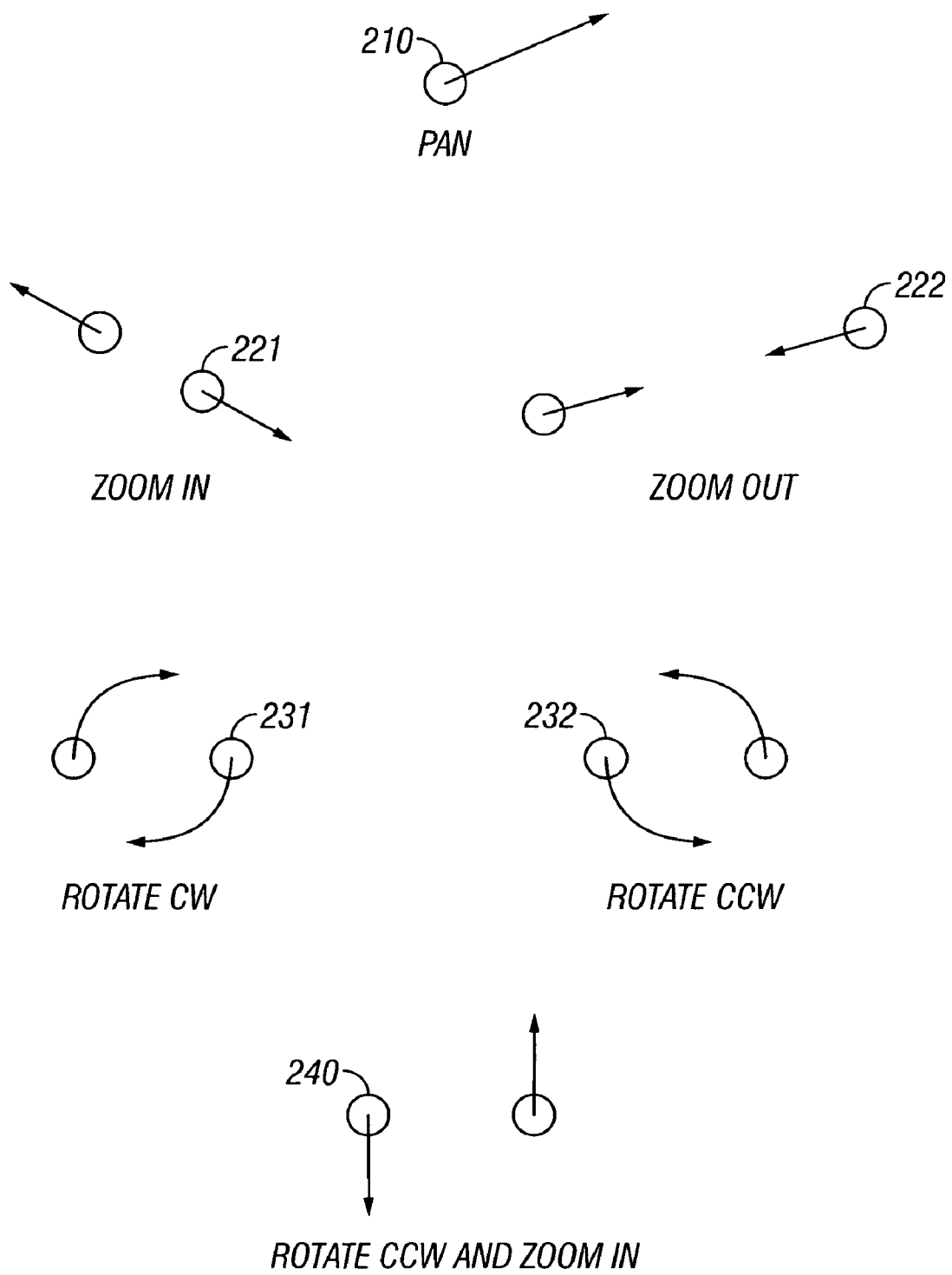
FIG. 4 shows a set of gestures and associated display control commands according to the preferred embodiment of the invention.

FIG. 4 shows a set of gestures and associated display control commands according to the preferred embodiment of the invention. If a user establishes and then moves a single contact location 210, the result is a panning movement, i.e. pure translation, of the imagery. The direction and rate of the pan is determined by the velocity of the contact location. If a user establishes two contact locations and initiates a separating motion 221, the results is a inward zoom of the imagery. Similarly, an approaching motion of the two contact locations results in an outward zoom 222. If a user establishes two contact locations and initiates a clockwise rotary motion 231 of the locations at a fixed radius about a center of rotation, the result is a clockwise rotation of the imagery about the center of rotation. The corresponding motion in a counterclockwise direction 232 results in a counterclockwise rotation. The foregoing provide presently preferred gestures. Those skilled in the art will appreciate that both additional gestures and/or different executions for such gestures may be chosen.

An important feature of this approach to identifying gestures and controlling the displayed imagery is that the basic motions described above can be combined to effect more complicated changes in the displayed imagery. For example, if a user establishes a right and a left contact location and initiates an offset separating motion, upward on the right and downward on the left 240, the result is a combined inward zoom and counterclockwise rotation.

In practice, inexperienced users of the interactive display may be overwhelmed by the power and flexibility of the above gestures and associated display control commands. For example, a user may be confused or disoriented when an imperfect attempt to zoom inward results in a combined inward zoom and a slight rotation. It may therefore be beneficial for the gesture identification procedure to classify gestures as one of several distinct, allowable gestures.

Figure 5:
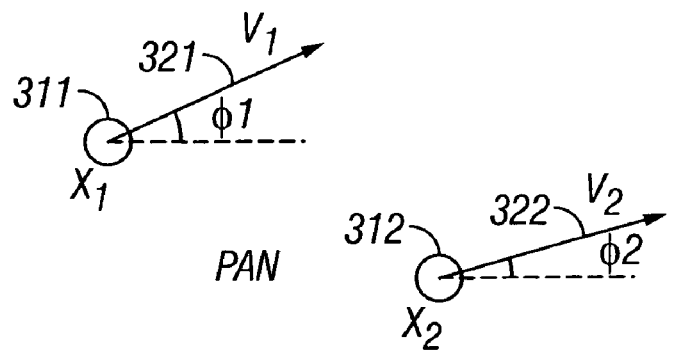
FIG. 5 shows a set of gestures and associated display control commands according to an alternative embodiment of the invention.
Figure 5:
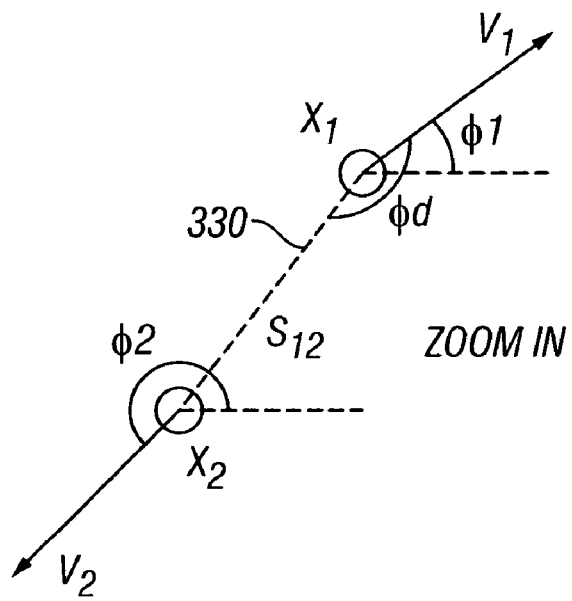
Figure 5:
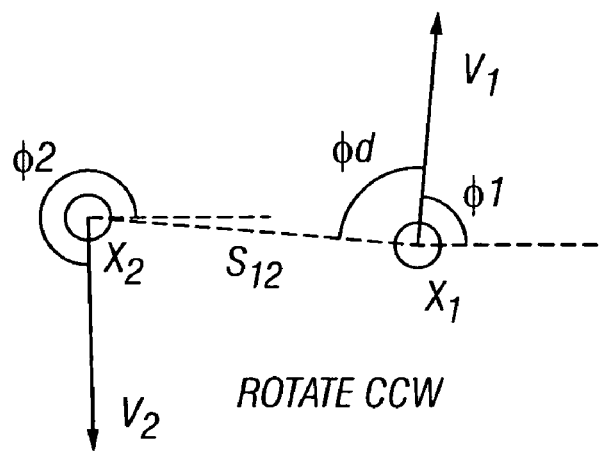

FIG. 5 shows a set of gestures and associated display control commands according to an alternative embodiment of the invention. In this approach to gesture identification, gestures that would result in a combined motion using the approach of FIG. 4 are classified as either a pure pan, zoom, or rotation. For example, consider an instance in which a user establishes and moves two contact locations characterized by positions $\vec{x}_1$ 311 and $\vec{x}_2$ 312. Velocities $\vec{v}_1$ 321 and $\vec{v}_2$ 322 are determined for each of the contact points, including magnitudes and directions $\phi_1$ and $\phi_2$. The directions are compared. If the directions are found to be similar, then the two contact points are treated as one. Specifically, if $$|\phi_1 - \phi_2| < \theta_c^p,$$

where $\theta_c^p$ is a predetermined tolerance, then either the first or second contact location and velocity is ignored, or the two contact locations and velocities are averaged. In either case, a single contact location and velocity is obtained, and the identified gesture is associated with a panning movement of the display.

As a further example, consider an instance in which a user establishes and moves two contact locations, as shown in the middle diagram of FIG. 5. Positions and velocities are determined as described above. In this instance, however, it is found that Equation 3 is not satisfied. In this case, the angle $\phi_d$ between the line segment $S_{12}$ 330 connecting the positions $\vec{x}_1$ and $\vec{x}_2$ and either of the two velocities is considered. In FIG. 5, the angle $\phi_d$ between $S_{12}$ and $\vec{v}_1$ is considered. If the line segment $S_{12}$ and the velocity are found to be in approximate alignment, then the gesture is identified as a request for a zoom of the display. That is, if $$|\pi - \phi_d| < \theta_c^z,$$

where $\theta_c^z$ is a predetermined tolerance, then the gestures is identified as a request for a zoom. To determine whether the display should be zoomed in or zoomed out, the length of the line segment $S_{12}$ is considered. If the length is decreasing, the gesture is identified as a request for an outward zoom. Correspondingly, if the length is increasing, as is shown in FIG. 5, the gesture is identified as a request for an inward zoom.

As yet another example, consider an instance in which a user establishes and moves two contact locations as shown in the lower diagram of FIG. 5. Again, Equation 3 is not satisfied. However, Equation 4 is also not satisfied. In this case, a check is performed to determine if one of the velocities is approximately perpendicular to the line segment $S_{12}$. If $$\left|\frac{\pi}{2} - \phi_d\right| < \theta_c^r,$$

where $\theta_c^r$ is a predetermined tolerance, then the gesture is identified as a request for a rotation of the display. The direction of the rotation may be determined by computing a cross product of one of the velocity vectors and a vector $\vec{s}_{12}$ connecting the two positions $\vec{x}_1$ and $\vec{x}_2$.

Finally, consider the instance in which none of Equations 3, 4, or 5 are satisfied. In this case, the gesture cannot be identified as a pure pan, zoom, or rotation. The gesture is therefore ignored, and the user may be alerted with an audible tone or visual cue that the gesture was not identified.

As noted above, if a gesture is identified, the display is updated accordingly. In each of the three cases, the rate at which the display is altered, e.g. panned, zoomed, or rotated, is proportional to the magnitude of the velocity of the contact points. Either one of the two velocities may be selected, or an average magnitude may be computed. A gain or attenuation may be applied to this velocity to provide the desired balance of speed and precision in display control.

The gesture based display control commands, such as those above, may be supplemented by other gestures and associated commands that extend the ability of users to interact intuitively with the information provided on the display. For example, if a user touches the display surface at a point corresponding to a displayed object for which properties are known, and the user maintains the contact for a period of time longer than a predetermined period of time $\tau_1$, the corresponding displayed object is selected. The user may then be presented with a series of operations that may be performed on the object. For example, a user selecting a city may be presented with options to list and update the census data associated with the city. Detailed information of this nature may be provided to the user directly on the display surface or via an auxiliary display located near the display surface.

The gesture based display control commands described above may be further supplemented by commands activated when a user touches specially defined regions within the display surface associated with a control interface presented within the imagery. A primary example is the use of menus, through which users may perform more complicated operations than can be described using simple gestures.

Figure 6:
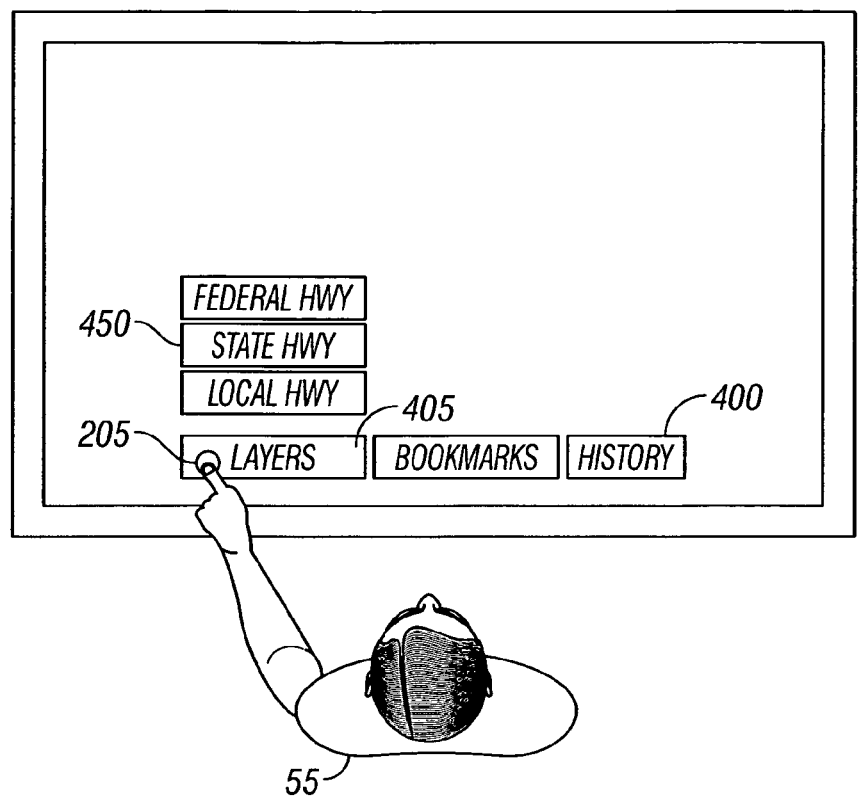
FIG. 6 shows an interactive, touch detecting display on which a user has activated a menu to reveal a submenu, according to the preferred embodiment of the invention.

FIG. 6 shows an interactive, touch detecting display on which a user has activated a menu to reveal a submenu, according to the preferred embodiment of the invention. A menu 400 containing several items is presented to the user. In the specific example of FIG. 6, the menu contains items providing access to functions related to imagery layers, bookmarks cataloguing previously display configurations stored at the request of the user, and a history of previous display configurations automatically stored by the system. By touching the display surface at a point 205 corresponding to one of the menu items, the corresponding menu item 405 is selected. If a single function or command is associated with the selected menu item, it is executed. In FIG. 6, a submenu 450 is displayed prompting the user 55 to select a more specific command. Specifically, the user is prompted to select which imagery layer or layers he would like to display. Selection within the submenu is accomplished in a similar manner.

Figure 7:
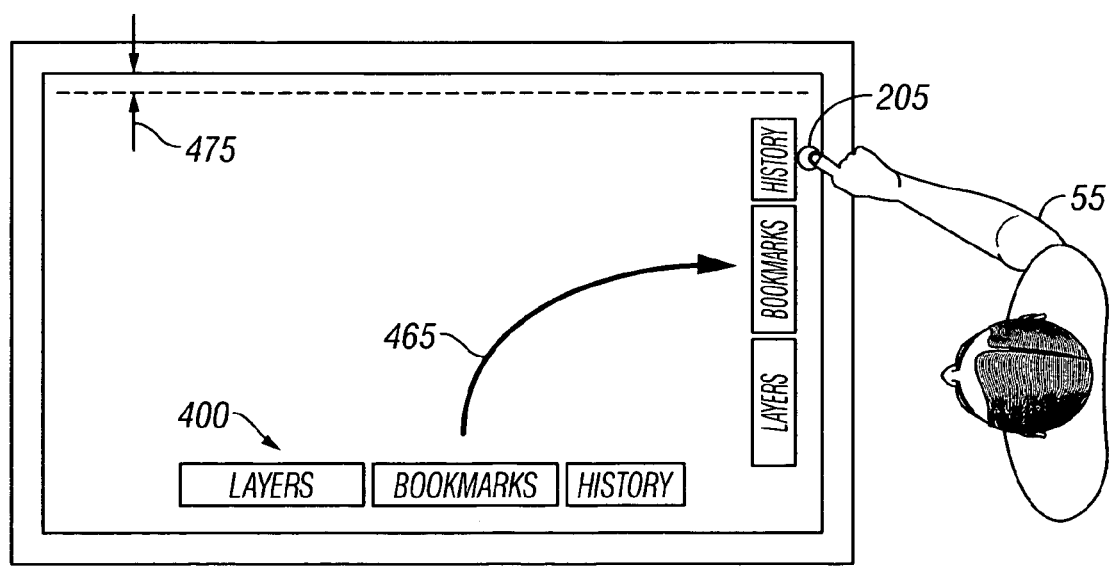
FIG. 7 shows an interactive, touch detecting display on which a user has moved and reoriented a menu according to the preferred embodiment of the invention.

FIG. 7 shows an interactive, touch detecting display on which a user has moved and reoriented a menu according to the preferred embodiment of the invention. The presence of the menu shown in FIG. 6 imparts an undesirable bias to the display, suggesting a preferred viewing position on the side of the display towards which the menu is oriented. To address this bias, and to facilitate the ease with which multiple users may investigate the displayed imagery, the orientation and location of the menus is adjustable. In FIG. 7, a user 55 towards which the menu 400 is not oriented touches the display surface at a point 205 near the periphery of the display surface. Because the point 205 of contact is within a predetermined distance $\epsilon_m$ 475 of the periphery of the display surface, the menu is moved and reoriented 465 to be more accessible to the user. This functionality provides an orientationless display that more naturally facilitates collaboration among multiple users.

Figure 8:
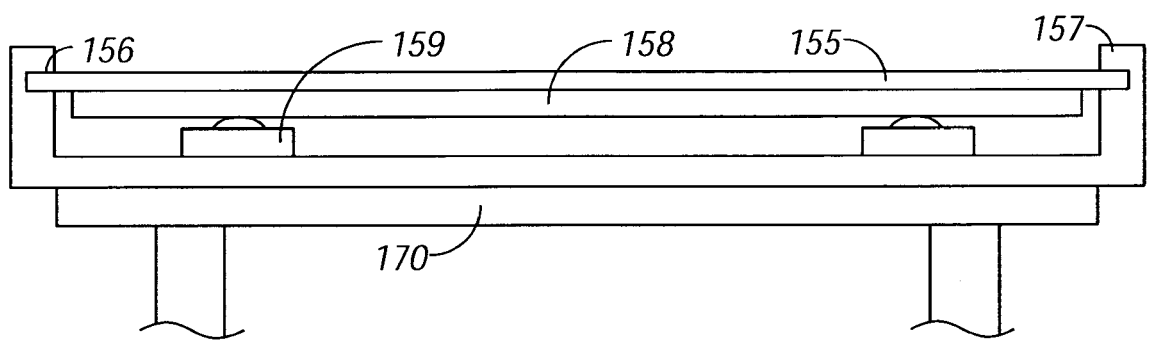
FIG. 8 shows a cross-sectional view of an interactive, touch detecting display incorporating load cells according to the invention.

FIG. 8 shows a cross-sectional view of an interactive, touch detecting display incorporating load cells according to the invention. In this and similar embodiments of the invention, it is possible to determine the intensity, i.e. the force, with which a user contacts the projection surface. For example, in FIG. 8, a flexible projection surface 155 is supported by a rigid subsurface plate 158. The edges of the flexible projection surface are secured by a gasket 156 clamped by a frame member 157. The frame member is supported by the table-like structure 170. Four load cells 159, each located beneath a corner of the rigid subsurface plate, are supported by the frame member and therefore the table-like structure. The subsurface plate is supported only by the load cells, and is therefore free to move relative to the frame member and table-like structure. Because the projection surface is flexible, any force imparted by a user as he touches the projection surface is transmitted through the projection surface and rigid subsurface plate to the load cells. By adding the loads measured by the four load cells, an intensity of the user contact with the projection surface can be determined. Once determined, the intensity of the contact can be used to supplement the identification of gestures described above. For example, when altering the visibility of image layers, touch intensity may be used to modify the transparency of a layer, with a low intensity contact denoting near full transparency, and a high intensity contact denoting full opacity. The intensity may also be used to determine the gain or attenuation applied to the velocity of the identified gestures. It should be noted that through a full static analysis of the loads measured by the load cells, considering both forces and moments perpendicular to the plane of the rigid subsurface plate, the location of user contact can also be determined. Thus, a system of load cells may be used as a supplement or alternative to the various touch detection mechanisms described above.

The particular configuration of load cells shown in FIG. 8 is only one of many possible configurations. Notably, the configuration of FIG. 8 is statically over-constrained with respect to motion normal to the plane of the rigid subsurface plate. Such a system may be advantageous in mitigating the effects of noise in the load cell measurements. However, a non-over-constrained configuration of load cells, i.e. three load cells, would greatly simplify the static analysis.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following claims.

The invention claimed is:

1. A method of operating an interactive display, comprising the steps of:
   providing a display surface;
   displaying imagery coincident with said display surface;
   detecting at least one contact location at which one user contacts said surface;
   storing a position history for each contact location;
   determining velocity information for each contact location based on said position history;
   identifying at least one user gesture based on any of:
     said position history, and
     said velocity information;
   measuring an intensity with which said user contacts said display surface;
   associating each gesture and said intensity with a command;
   executing said command to alter said imagery; and performing a visual analysis of a material layer mechanically coupled to said display surface, said material layer changing optical properties in response to an applied pressure;

whereby said user controls said interactive display by direct physical interaction with said imagery.

2. The method of claim 1, wherein said imagery is geographic information systems imagery.

3. The method of claim 1, wherein said display surface is a substantially horizontal surface.

4. The method of claim 3, said interactive display comprising:
   a railing;
   wherein said railing substantially surrounds said display surface; and wherein said railing provides a visual cue discouraging said user from leaning onto said display surface.

5. The method of claim 1, wherein said display surface is a projection surface, and said imagery is produced by a projector.

6. The method of claim 5, wherein said command is a separating motion and said altered imagery is an inward zoom.

7. The method of claim 1, wherein said command is a display control command that when executed effects any of:
   a panning movement of said imagery,
   an inward zoom of said imagery,
   an outward zoom of said imagery, and
   a rotation of said imagery.

8. The method of claim 1, wherein said detecting step comprises any of the steps of:
   operating at least one infrared emitter and receiver pair:
   operating a capacitive touch pad;
   operating an ultrasound system;
   operating a resistive touch pad, and the step of
   measuring an intensity with which said user contacts said display surface.

9. The method of claim 1, wherein said identifying step, said associating step, and said executing step collectively comprise the steps of:
   pairing each contact location with a pixel within said imagery; and
   updating said imagery to maintain said pixel coincident with each corresponding contact location.

10. The method of claim 1, wherein said identifying step comprises the step of:
    classifying said position history and said velocity information as one of a set of distinct gestures.

11. The method of claim 10, wherein said classifying is based on any of:
    a direction of said velocity information for said contact location;
    a difference of two directions;
    a comparison of at least two directions;
    a length of a line segment connecting a first point within said position history of a first contact location to a second point within said position history of a second contact location; and
    a direction of a line segment connecting a first point within said position history of a first contact location to a second point within said position history of a second contact location.

12. The method of claim 1, wherein said command, when executed effects any of:
    a selection of an object represented within said imagery;
    a selection of a menu item represented within said imagery;
    a selection of a submenu item represented within said imagery;
    a change in a transparency of said imagery;
    a change in a visibility of at least one imagery layer within said imagery; and
    a change in a transparency of at least one imagery layer within said imagery.

13. The method of claim 1, wherein said imagery comprises a representation of at least one control interface.

14. The method of claim 13, wherein said at least one control interface comprises a menu.

15. The method of claim 13, wherein said at least one control interface is positioned proximate to and oriented towards a first location on a periphery of said display surface; and wherein said command, when executed, effects any of a movement, and a reorientation of said at least one control interface; wherein said at least one control interface is positioned proximate to and oriented towards a second location on a periphery of said display surface.

16. The method of claim 15, wherein said position history indicates a contact location proximate to said second location.

17. The method of claim 1, wherein said command is an approaching motion and said altered imagery is an outward zoom.

18. The method of claim 1, wherein said intensity comprises a force determined using measurements obtained by load cells mechanically coupled with said display surface.

19. An interactive display, comprising:
    a display surface;
    imagery coincident with said display surface;
    means for detecting at least one contact location at which at least one user contacts said display surface;
    means for storing a position history for each contact location;
    means for determining velocity information for each contact location based on said position history;
    means for identifying at least one user gesture based on any of:
        said position history; and
        said velocity information;
    means for measuring intensity with which said user contacts said display surface;
    means for associating each gesture and said measured intensity with a command;
    means for executing said command to alter said imagery;
    means for performing a visual analysis of a material layer mechanically coupled to said display surface, said material layer changing at least one optical property in response to an applied pressure:
    whereby said user controls said interactive display by direct physical interaction with said imagery.

20. The interactive display of claim 19, wherein said display surface is a substantially horizontal surface.

21. The interactive display of claim 19, further comprising:
    a railing,
    wherein said railing substantially surrounds said display surface; and
    wherein said railing provides a visual cue discouraging said user from leaning onto said display surface.

22. The interactive display of claim 19, wherein said display surface is a projection surface, and said imagery is produced by a projector.

23. The interactive display of claim 22, wherein said display is a front projection surface.

24. The interactive display of claim 19, wherein said command is a display control command that when executed effects any of:

a panning movement of said imagery,
an inward zoom of said imagery,
an outward zoom of said imagery, and
a rotation of said imagery.

25. The interactive display of claim 19, said means for detecting comprising of:
at least one infrared emitter and receiver pair;
a capacitive touch pad;
an ultrasound system; and
a resistive touch pad.

26. The interactive display of claim 19, further comprising:
means for classifying said position history and said velocity information as one of a set of distinct gestures.

27. The interactive display of claim 26, said classifying means performing said classifying based on any of:
a direction of said velocity information for said contact location;
a difference of two directions;
a comparison of at least two directions;
a length of a line segment connecting a first point within said position history of a first contact location to a second point said position history of a second contact location; and
a direction of a line segment connecting a first point within said position history of a first contact location to a second point within said position history of a second contact location.

28. The interactive display of claim 19, wherein said imagery comprises a representation of at least one control interface.

29. The interactive display of claim 28 wherein said at least one control interface comprises a menu.

30. The interactive display of claim 19,
wherein said command is an approaching motion and said altered imagery is an outward zoom.

31. The interactive display of claim 19, wherein said intensity comprises a force determined using measurement obtained by load cells mechanically coupled with said display surface.

32. An interactive display, comprising:
a display surface;
imagery coincident with said display surface;
means for detecting at least one contact location at which at least one user contacts said display surface;
means for storing a position history for each contact location;
means for determining velocity information for each contact location based on said position history;
means for identifying at least one user gesture based on any of:
said position history; and
said velocity information;
means for measuring intensity with which said user contacts said display surface;
means for associating each gesture and said measured intensity with a command; and
means for executing said command to alter said imagery;
wherein said at least one control interface is positioned proximate to and oriented towards a first location on a periphery of said display surface; and
wherein said command, when executed, effects any movement, and a reorientation of said at lest one control interface; wherein such said control interface is positioned proximate to and oriented towards a second location on a periphery of said display surface.

33. A method of operating an interactive display, comprising the steps of:
providing a display surface;
displaying imagery coincident with said display surface;
detecting at least one contact location at which one user contacts said surface, said detecting further comprising performing a visual analysis of a material layer mechanically coupled to said display surface, said material layer changing optical properties in response to an applied pressure;
storing a position history for each contact location;
determining velocity information for each contact location based on said position history; and
identifying at least one user gesture based on any of:
said position history, and
said velocity information;
associating each gesture with a command; and
executing said command to alter said imagery;
whereby said user controls said interactive display by direct physical interaction with said imagery.

34. The method of claim 33, wherein said imagery is geographic information systems imagery.

35. The method of claim 33, wherein said display surface is a substantially horizontal surface.

36. The method of claim 33, said interactive display comprising:
a railing;
wherein said railing substantially surrounds said display surface; and
wherein said railing provides a visual cue discouraging said user from leaning onto said display surface.

37. The method of claim 33, wherein said display surface is a projection surface, and said imagery is produced by a projector.

38. The method of claim 37, wherein said display surface is a front projection surface.

39. The method of claim 33, wherein said command is a display control command that when executed effects any of:
a panning movement of said imagery,
fan inward zoom of said imagery,
an outward zoom of said imagery, and
a rotation of said imagery.

40. The method of claim 33, wherein said detecting step comprises any of the steps of:
operating at least one infrared emitter and receiver pair;
operating a capacitive touch pad;
operating an ultrasound system;
operating a resistive touch pad, and the step of measuring an intensity with which said user contacts said display surface.

41. The method of claim 33, wherein said identifying step, said associating step, and said executing step collectively comprise the steps of:
pairing each contact location with a pixel within said imagery; and
updating said imagery to maintain said pixel coincident with each corresponding contact location.

42. The method of claim 33, wherein said identifying step comprises the step of:
classifying said position history and said velocity information as one of a set of distinct gestures.

43. The method of claim 42, wherein said classifying is based on any of:
a direction of said velocity information for said contact location;
a difference of two directions;
a comparison of at least two directions;

a length of a line segment connecting a first point within said position history of a first contact location to a second point within said position history of a second contact location; and a direction of a line segment connecting a first point within said position history of a first contact location to a second point within said position history of a second contact location.

44. The method of claim 33, wherein said command, when executed, effects any of:
   a selection of an object represented within said imagery;
   a selection of a menu item represented within said imagery;
   a selection of a submenu item represented within said imagery;
   a change in a transparency of said imagery;
   a change in a visibility of at least one imagery layer within said imagery; and
   a change in a transparency of at least one imagery layer within said imagery.

45. The method of claim 33, wherein said imagery comprises a representation of at least one control interface.

46. The method of claim 45, wherein said at least one control interface comprises a menu.

47. The method of claim 45, wherein said at least one control interface is positioned proximate to and oriented towards a first location on a periphery of said display surface;
   wherein said command, when executed, effects any of a movement, and a reorientation of said at least one control interface; and
   wherein said at least one control interface is positioned proximate to and oriented towards a second location on a periphery of said display surface.

48. The method of claim 47, wherein said position history indicates a contact location proximate to said second location.

49. The method of claim 33, further comprising the step of:
   measuring an intensity with which said user contacts said display surface;
   wherein said gesture is additionally identified based on said intensity.

50. The method of claim 49, wherein said intensity comprises a force determined using measurements obtained by load cells mechanically coupled with said display surface.

51. A method of operating an interactive display, comprising the steps of:
   providing a display surface;
   displaying imagery coincident with said display surface;
   detecting at least one contact location at which one user contacts said surface;
   storing a position history for each contact location;
   determining velocity information for each contact location based on said position history;
   measuring an intensity with which said user contacts said display surface;
   identifying at least one user gesture based on any of:
      said position history;
      said velocity information; and
      said intensity;
   associating each gesture with a command;
   executing said command to alter said imagery; and
   performing a visual analysis of a material layer mechanically coupled to said display surface, said material layer changing optical properties in response to an applied pressure;
   whereby said user controls said interactive display by direct physical interaction with said imagery.

52. The method of claim 51, wherein said imagery is geographic information systems imagery.

53. The method of claim 51, wherein said display surface is a substantially horizontal surface.

54. The method of claim 53, said interactive display comprising:
   a railing;
      wherein said railing substantially surrounds said display surface; and
      wherein said railing provides a visual cue discouraging said user from leaning onto said display surface.

55. The method of claim 51, wherein said display surface is a projection surface, and said imagery is produced by a projector.

56. The method of claim 55, wherein said display surface is a front projection surface.

57. The method of claim 51, wherein said command is a display control command that when executed effects any of:
   a panning movement of said imagery,
   fan inward zoom of said imagery,
   an outward zoom of said imagery, and
   a rotation of said imagery.

58. The method of claim 51, wherein said detecting step comprises any of the steps of:
   operating at least one infrared emitter and receiver pair:
   operating a capacitive touch pad;
   operating an ultrasound system;
   operating a resistive touch pad, and the step of
   measuring an intensity with which said user contacts said display surface.

59. The method of claim 51, wherein said identifying step, said associating step, and said executing step collectively comprise the steps of:
   pairing each contact location with a pixel within said imagery; and
   updating said imagery to maintain said pixel coincident with each corresponding contact location.

60. The method of claim 51, wherein said identifying step comprises the step of:
   classifying said position history and said velocity information as one of a set of distinct gestures.

61. The method of claim 60, wherein said classifying is based on any of:
   a direction of said velocity information for said contact location;
   a difference of two directions;
   a comparison of at least two directions:
   a length of a line segment connecting a first point within said position history of a first contact location to a second point within said position history of a second contact location; and
   a direction of a line segment connecting a first point within said position history of a first contact location to a second point within said position history of a second contact location.

62. The method of claim 51, wherein said command, when executed, effects any of:
   a selection of an object represented within said imagery;
   a selection of a menu item represented within said imagery;
   a selection of a submenu item represented within said imagery;
   a change in a transparency of said imagery;
   a change in a visibility of at least one imagery layer within said imagery; and
   a change in a transparency of at least one imagery layer within said imagery.

63. The method of claim 51, wherein said imagery comprises a representation of at least one control interface.

64. The method of claim 63, wherein said at least one control interface comprises a menu.

65. The method of claim 63, wherein said at least one control interface is positioned proximate to and oriented towards a first location on a periphery of said display surface;
   wherein said command, when executed, effects any of a movement, and a reorientation of said at least one control interface; and
   wherein said at least one control interface is positioned proximate to and oriented towards a second location on a periphery of said display surface.

66. The method of claim 65, wherein said position history indicates a contact location proximate to said second location.

67. The method of claim 51, wherein said intensity comprises a force determined using measurements obtained by load cells mechanically coupled with said display surface.

68. An interactive display, comprising:
   a display surface;
   imagery coincident with said display surface, wherein the imagery comprises a representation of at least one control interface, wherein said at least one control interface is positioned proximate to and oriented towards a first location on a periphery of said display surface;
   wherein said command, when executed, effects any movement, and a reorientation of said at least one control interface; wherein such said control interface is positioned proximate to and oriented towards a second location on a periphery of said display surface;
   means for detecting at least one contact location at which at least one user contacts said display surface;
   means for storing a position history for each contact location;
   means for determining velocity information for each contact location based on said position history;
   means for measuring intensity with which said user contacts said displays surface;
   means for identifying at least one user gesture based on any of:
      said intensity;
      said position history; and
      said velocity information;
   means for associating each gesture with a command; and
   means for executing said command to alter said imagery;
   whereby said user controls said interactive display by direct physical interaction with said imagery.

69. The interactive display of claim 68, wherein said display surface is a substantially horizontal surface.

70. The interactive display of claim 68, further comprising:
   a railing,
      wherein said railing substantially surrounds said display surface; and
      wherein said railing provides a visual cue discouraging said user from leaning onto said display surface.

71. The interactive display of claim 68, wherein said display surface is a projection surface, and said imagery is produced by a projector.

72. The interactive display of claim 71, wherein said display is a front projection surface.

73. The interactive display of claim 68, wherein said command is a display control command that when executed effects any of:
   a panning movement of said imagery,
   an inward zoom of said imagery,
   an outward zoom of said imagery, and
   a rotation of said imagery.

74. The interactive display of claim 68, said means for detecting comprising of:
   at least one infrared emitter and receiver pair;
   a capacitive touch pad;
   an ultrasound system; and
   a resistive touch pad.

75. The interactive display of claim 68, further comprising:
   means for performing a visual analysis of a material layer mechanically coupled to said display surface, said material layer changing optical properties in response to an applied pressure.

76. The interactive display of claim 68, further comprising:
   means for classifying said position history and said velocity information as one of a set of distinct gestures.

77. The interactive display of claim 76, said classifying means performing said classifying based on any of:
   a direction of said velocity information for said contact location;
   a difference of two directions;
   a comparison of at least two directions;
   a length of a line segment connecting a first point within said position history of a first contact location to a second point said position history of a second contact location; and
   a direction of a line segment connecting a first point within said position history of a first contact location to a second point within said position history of a second contact location.

78. The interactive display of claim 77 wherein said at least one control interface comprises a menu.

79. The interactive display of claim 68, wherein said intensity comprises a force determined using measurement obtained by load cells mechanically coupled with said display surface.

* * * * *

UNITED STATES PATENT AND TRADEMARK OFFICE
CERTIFICATE OF CORRECTION

| | | |
|---|---|---|
| PATENT NO. | : 7,728,821 B2 | Page 1 of 1 |
| APPLICATION NO. | : 10/913105 | |
| DATED | : June 1, 2010 | |
| INVENTOR(S) | : W. Daniel Hillis et al. | |

It is certified that error appears in the above-identified patent and that said Letters Patent is hereby corrected as shown below:

On the title page, item [56]:

On page 3, in column 1, under "Other Publications", line 28, delete "997-986," and insert -- 977-986, --, therefor.

On page 3, in column 2, under "Other Publications", line 6, delete "Ddiabetes" and insert -- Diabetes --, therefor.

On page 3, in column 2, under "Other Publications", line 27, delete "TechoOnLine" and insert -- TechOnLine --, therefor.

In column 2, line 12-15, After "surface." delete "Optionally, the position history and velocity information are supplemented with measurements of the intensity with which a user contacts the display surface.".

In column 4, line 4, delete "the a" and insert -- the --, therefor.

In column 7, line 16, delete "$\tau_1$," and insert -- $\tau_t$, --, therefor.

In column 9, line 32, in claim 8, delete "pair:" and insert -- pair; --, therefor.

In column 9, line 35, in claim 8, delete "pad," and insert -- pad; --, therefor.

In column 9, line 65, in claim 12, delete "executed" and insert -- executed, --, therefor.

Signed and Sealed this

Fifth Day of October, 2010

David J. Kappos
*Director of the United States Patent and Trademark Office*